(12) United States Patent
Marola

(10) Patent No.: US 8,690,514 B2
(45) Date of Patent: Apr. 8, 2014

(54) HEAVY DUTY VEHICLE RECOVERY SYSTEM

(76) Inventor: Martin A. Marola, Goshen, CT (US)

( * ) Notice: Subject to any disclaimer, the term of this patent is extended or adjusted under 35 U.S.C. 154(b) by 243 days.

(21) Appl. No.: 13/010,379

(22) Filed: Jan. 20, 2011

(65) Prior Publication Data

US 2011/0182706 A1 Jul. 28, 2011

Related U.S. Application Data

(60) Provisional application No. 61/336,503, filed on Jan. 22, 2010, provisional application No. 61/412,561, filed on Nov. 11, 2010.

(51) Int. Cl.
*B60P 3/12* (2006.01)
*B60P 3/071* (2006.01)
*B62D 53/04* (2006.01)

(52) U.S. Cl.
USPC ........... 414/563; 212/232; 212/233; 212/299; 280/402

(58) Field of Classification Search
CPC ............. B60P 3/06; B60P 3/07; B60P 3/071; B60P 3/12; B60P 3/064; B60P 3/073; B60P 3/075; B62D 53/00; B62D 53/04
USPC ......... 212/232, 233, 234, 236, 238, 299, 302; 280/402; 414/561, 563
See application file for complete search history.

(56) References Cited

U.S. PATENT DOCUMENTS

| 1,237,573 | A | * | 8/1917 | Stogsdill | 212/233 |
|---|---|---|---|---|---|
| 1,630,800 | A | * | 5/1927 | Page | 212/172 |
| 2,183,478 | A | * | 12/1939 | Holmes et al. | 414/563 |
| 2,449,146 | A | * | 9/1948 | Ryan | 414/563 |
| 2,481,223 | A | * | 9/1949 | Johnson | 414/563 |
| 2,625,278 | A | * | 1/1953 | Sensenbaugh | 414/563 |
| 2,625,279 | A | * | 1/1953 | Dalby et al. | 414/563 |
| 3,048,286 | A | * | 8/1962 | Sprague | 414/563 |
| 3,103,288 | A | * | 9/1963 | Pruss | 298/8 T |
| 3,169,602 | A | * | 2/1965 | Myers | 182/46 |
| 3,257,020 | A | * | 6/1966 | Fairclough | 414/522 |
| 3,285,443 | A | * | 11/1966 | Gaumont | 414/563 |
| 3,313,432 | A | * | 4/1967 | Sheldrew | 414/728 |
| 3,450,417 | A | * | 6/1969 | Ulrich et al. | 280/441.2 |
| 3,485,505 | A | * | 12/1969 | Schmidt | 280/81.1 |
| 3,685,673 | A | * | 8/1972 | Schweis | 414/547 |
| 3,729,215 | A | * | 4/1973 | Paakkinen | 280/441.2 |
| 3,764,166 | A | * | 10/1973 | Fiala | 280/441.2 |
| 3,866,713 | A | * | 2/1975 | Carpenter et al. | 182/2.1 |
| 3,874,703 | A | * | 4/1975 | Ross et al. | 280/425.1 |
| 3,891,056 | A | * | 6/1975 | Ashworth | 182/148 |
| 4,222,457 | A | * | 9/1980 | Ashworth | 182/2.9 |
| 4,316,617 | A | * | 2/1982 | Flaugh | 280/402 |

(Continued)

*Primary Examiner* — Saul Rodriguez
*Assistant Examiner* — Brendan Tighe
(74) *Attorney, Agent, or Firm* — Alix, Yale & Ristas, LLP

(57) ABSTRACT

A heavy duty vehicle recovery system employs a crane/tow boom assembly which is pivotally mounted to an upright assembly and is transformable between various positions. Two variably positionable booms with slidable extensions are provided. The crane/tow boom assembly extends rearwardly from the lower portion of the upright assembly. When the upright assembly is in an upright position, the boom assembly is upwardly pivotal from the upright assembly. When the upright assembly is in a reclined position, the crane/tow boom assembly is pivotally transformable to a transport position generally parallel to the upright assembly. The crane booms may be independently positioned at different elevational angles and different extensions.

10 Claims, 14 Drawing Sheets

(56) References Cited

U.S. PATENT DOCUMENTS

| | | | | |
|---|---|---|---|---|
| 4,582,206 A * | 4/1986 | Johnson | | 212/264 |
| 4,646,875 A * | 3/1987 | Sholl | | 182/2.6 |
| 4,700,852 A * | 10/1987 | Mjoberg | | 212/231 |
| 4,746,024 A * | 5/1988 | Hensler | | 212/283 |
| 4,778,333 A * | 10/1988 | Youmans et al. | | 414/563 |
| 4,840,534 A * | 6/1989 | Totty | | 414/563 |
| 4,861,224 A * | 8/1989 | Holmes | | 414/680 |
| 4,993,911 A * | 2/1991 | Grant | | 414/563 |
| 5,163,803 A * | 11/1992 | Marola | | 414/563 |
| 5,213,466 A * | 5/1993 | Bubik | | 414/494 |
| 5,236,214 A * | 8/1993 | Taylor | | 280/402 |
| 5,249,911 A * | 10/1993 | Marola | | 414/563 |
| 5,704,498 A * | 1/1998 | Smith et al. | | 212/231 |
| 5,931,321 A * | 8/1999 | Grant | | 212/233 |
| 5,984,614 A * | 11/1999 | Weber | | 414/498 |
| 6,044,991 A * | 4/2000 | Freudenthal et al. | | 212/278 |
| 6,089,818 A * | 7/2000 | Hill et al. | | 414/563 |
| 6,129,226 A * | 10/2000 | Donovan | | 212/300 |
| 6,443,685 B1 * | 9/2002 | Maeno | | 414/563 |
| 6,488,161 B1 * | 12/2002 | Bean | | 212/300 |
| 6,810,993 B2 * | 11/2004 | Promersberger et al. | | 182/2.9 |
| 7,156,591 B2 * | 1/2007 | Marola | | 410/23 |
| 2011/0182706 A1 * | 7/2011 | Marola | | 414/561 |

* cited by examiner

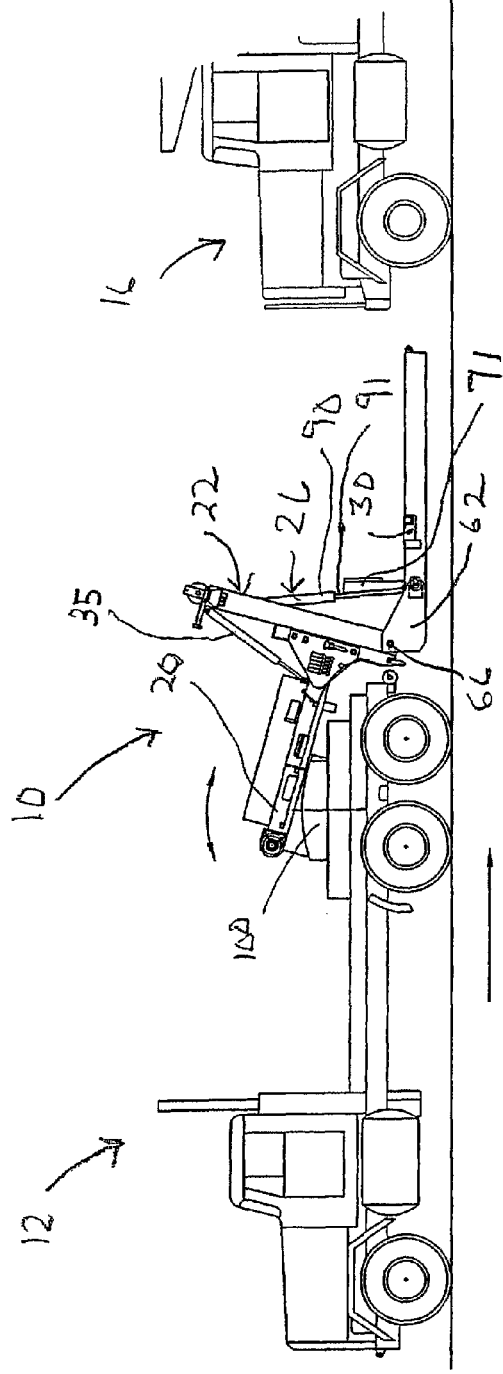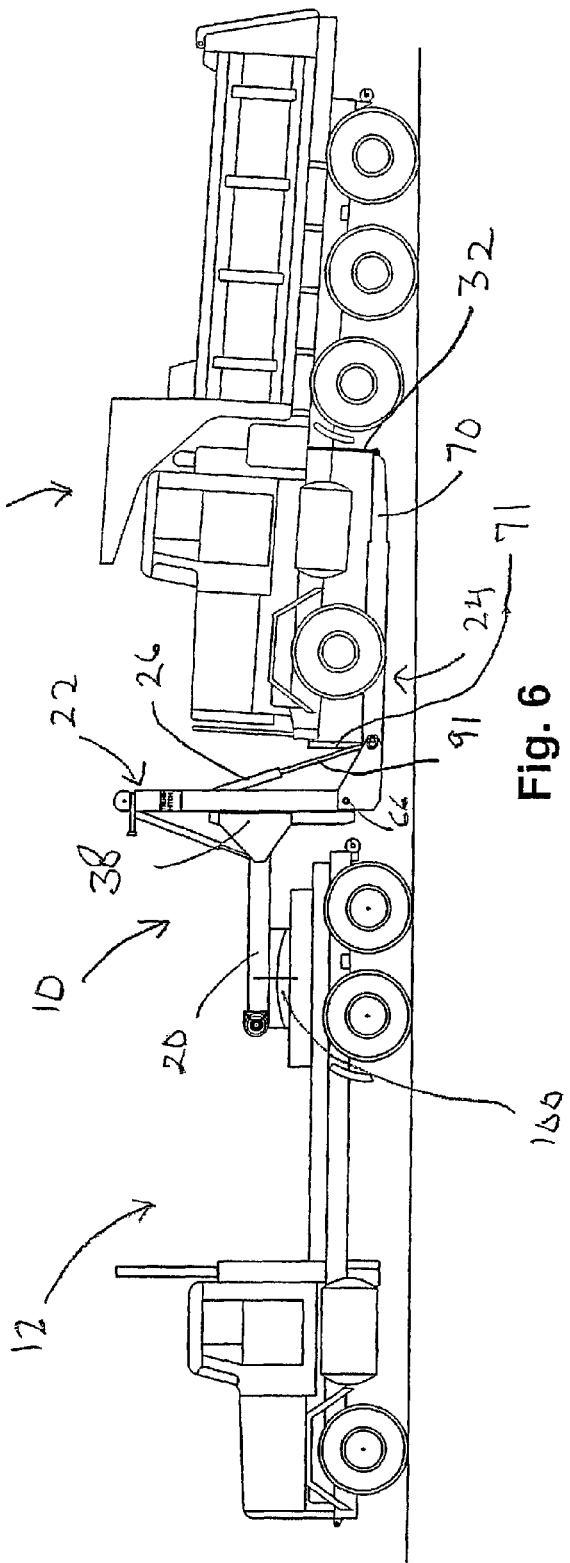

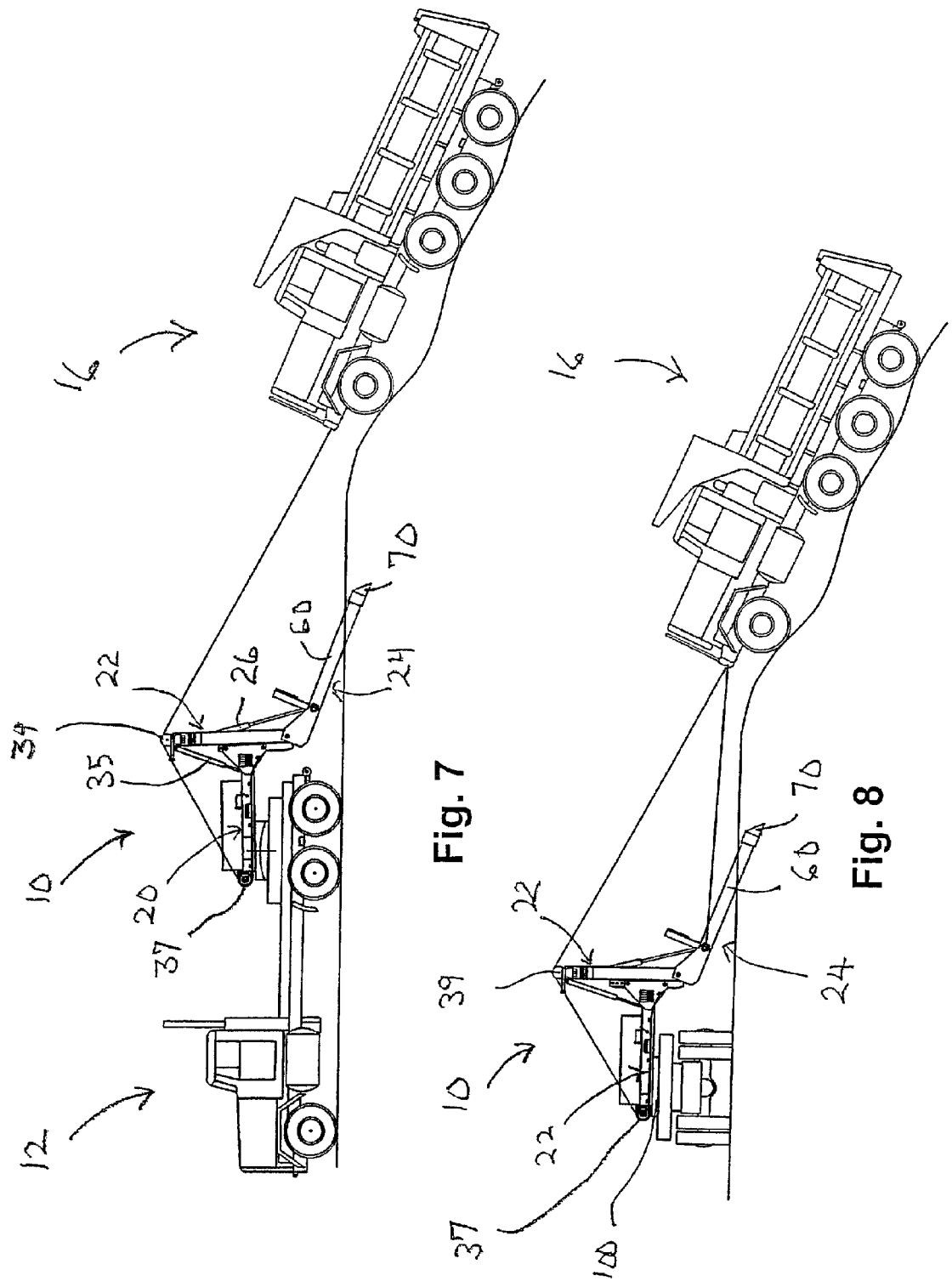

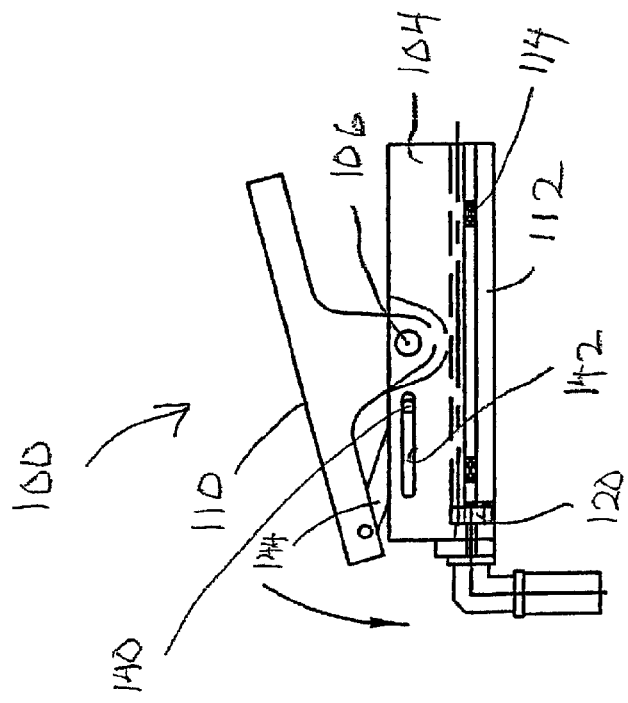
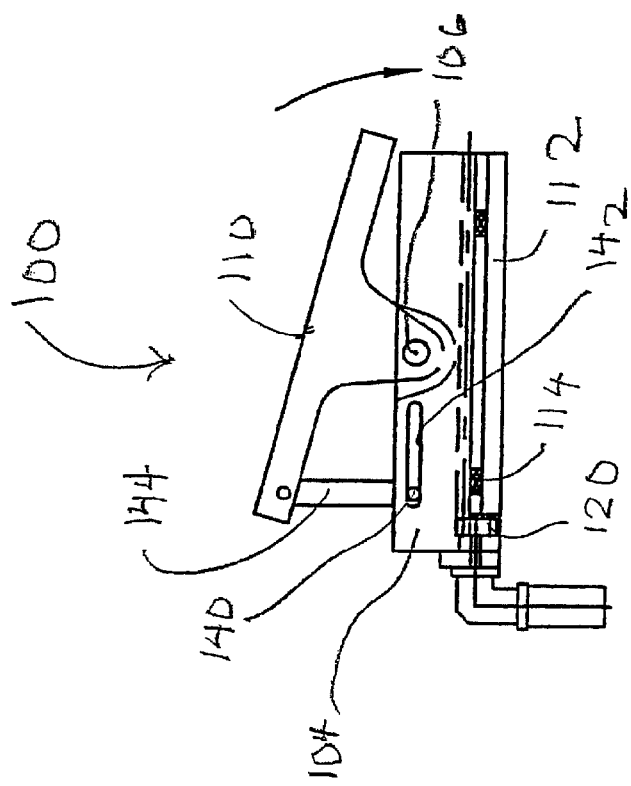
Fig. 13
Fig. 12

HEAVY DUTY VEHICLE RECOVERY SYSTEM

CROSS-REFERENCE TO RELATED APPLICATIONS

This application claims the priority of U.S. Provisional Application No. 61/336,503 filed on Jan. 22, 2010 and U.S. Provisional Application No. 61/412,561 filed on Nov. 11, 2010, the entirety of which applications are incorporated herein by reference.

BACKGROUND

This disclosure relates generally to devices employed for recovering disabled heavy duty vehicles which may, for example, be military trucks, tanks and other armored vehicles. More particularly, this disclosure relates to devices employed for towing and to devices employed for hoisting.

In U.S. Pat. No. 5,249,911 of the inventor herein and to which the present disclosure relates, a truck towing boom attaches to the fifth wheel of a tractor. The assembly has a pair of uprights and a pair of pivotally mounted legs. Hydraulic cylinders are actuated to force the legs to a pivoted position which lifts the legs on the tow truck to an elevated position for towing. The legs are supported by a collapsible wheel assembly. The disclosed boom assembly is variably vertically positioned and in one embodiment is collapsible to a compact storage configuration.

The present disclosure relates to a highly versatile multi-functional boom assembly which is especially adapted for the recovery of heavy duty military vehicles such as tanks, armored carriers, Humvees® and other applications and especially adapted for recovery in harsh and adverse conditions. The present disclosure relates to a boom assembly which may be transformable between a functioning crane and a towing boom with an underlift that may be effectively used for towing.

SUMMARY

Briefly stated, a recovery system comprises a swivel base assembly having first and second mounting members which are relatively rotatable about a first axis and relatively pivotable about a second axis orthogonal to the first axis. A main frame is mounted to the first mounting member of the swivel base assembly. The main frame is rotatable about the first axis from the first reference position to a second reference position diametrically opposite the first position and pivotable about the second axis. An upright assembly is pivotally mounted to the main frame. The upright assembly is foldably transformable between a generally upright position and a reclined position.

A crane/tow boom assembly is pivotally mounted to the upright assembly. The crane/tow boom comprises a pair of booms with slidably extendable extensions. The boom assembly extends rearwardly from a lower portion of the upright assembly when the upright assembly is in the upright position. The boom assembly is pivotable upwardly from the upright assembly when the upright assembly is in the reclined position, and is pivotably transformable to a transport position generally parallel to the upright assembly.

The extensions are independently positionable. The booms are also independently angularly positionable. In one embodiment a recovery vehicle has a rear portion. The second mounting member is fixedly mounted to the rear portion.

The main support frame comprises a pair of laterally spaced beams which pivotally connect at one end with a pair of uprights at an intermediate location of the upright. The uprights and beams are projectable by hydraulic means to a substantially perpendicular relationship. A winch at the end of each beam generally opposite the pivotal connection with the upright assembly. The booms are independently positionable by hydraulic means. The tow/boom assembly further comprises a pair of hydraulic cylinders with rods and comprises a pair of bumper strips which project generally upwardly at a rear location of the rods to protect the hydraulic cylinders and rods from impact.

The swivel base in one embodiment comprises a platform having at its underside a circular rack and a pinion which meshes with the rack. The pinion is driven through a motor gear box to rotate a platform relative to a stationary plate. A guide pin follows a channel and connects via an arm with a table to limit pivotal oscillation of the table. A lock sub-assembly automatically falls into a locked configuration.

In one embodiment a crane assembly comprises a main beam assembly with a pair of longitudinally spaced support brackets. The main beam assembly is mounted to a swivel base assembly. An upright assembly pivotally connects to one bracket and is positionable in a first position supported by the second bracket in a generally longitudinal position and is positionable in a second position generally perpendicular to the support assembly. A boom assembly is pivotally connected to the upright assembly. The boom assembly has a first member and an extension slidably received by the first member and extendable to an extended position from a retracted position. The boom assembly is pivotable to a stable inclined position in the extended position when the upright assembly is in the first position and also when the upright assembly is in the second position.

The boom assembly preferably comprises a pair of members each with an outer boom extension slidably received by the member. A sleeve interface is mounted to reinforce the interface between each boom and each outer boom extension. Each outer boom extension includes a pulley over which a cable from a winch is suspended. Each of the booms is independently positionable with respect axial extension, and also with respect to the elevation angle.

One support bracket has a first opening and the upright assembly defines a second opening which aligns with the first opening in the second position. A pin extends through the openings to secure the upright assembly in the second position.

BRIEF DESCRIPTION OF THE DRAWINGS

FIG. 5 is a side elevational view, partly in diagram form, of the tractor truck and recovery module of FIG. 3 as it approaches a heavy duty vehicle to be towed (partially shown) with the recovery module being positioned in a pre-towing mode;

FIG. 6 is a side elevational view of the recovery module and tractor truck of FIG. 1 with the recovery module being configured and attached to the heavy duty vehicle for towing;

FIG. 7 is a side elevational view of the recovery module and tractor truck of FIG. 5 with the recovery module being configured in a pull mode and connected to a heavy duty vehicle to be pulled from a lower location;

FIG. 8 is a rear elevational view of a portion of the tractor truck of FIG. 7 with the recovery module being rotated to a 90° orientation and the heavy duty truck being connected in a winching recovery mode;

FIG. 12 is an elevational view, partly in phantom and partly in diagram form, illustrating a clockwise oscillation relative to the horizontal orientation;

FIG. 13 is an elevational view, partly in phantom and partly in diagram form, illustrating a counterclockwise oscillation from the horizontal position of the rotary oscillating unit;

DETAILED DESCRIPTION

With reference to the drawings wherein like numerals represent like parts throughout the several figures, a heavy duty vehicle recovery module is generally designated by the numeral 10. The recovery module 10 is adapted to be installed at the rear portion of a recovery vehicle such as a tractor truck 12 or an armored tractor 14 for both towing and pulling a disabled heavy duty vehicle and/or functioning as a crane for hoisting at least part of the vehicle for recovery purposes. The recovery module 10 has application in connection with towing heavy duty vehicles of various sizes and configurations and, in particular, has application in connection with recovering armored vehicles, tanks and other military vehicles subject to highly adverse conditions and environments.

Figure 1:
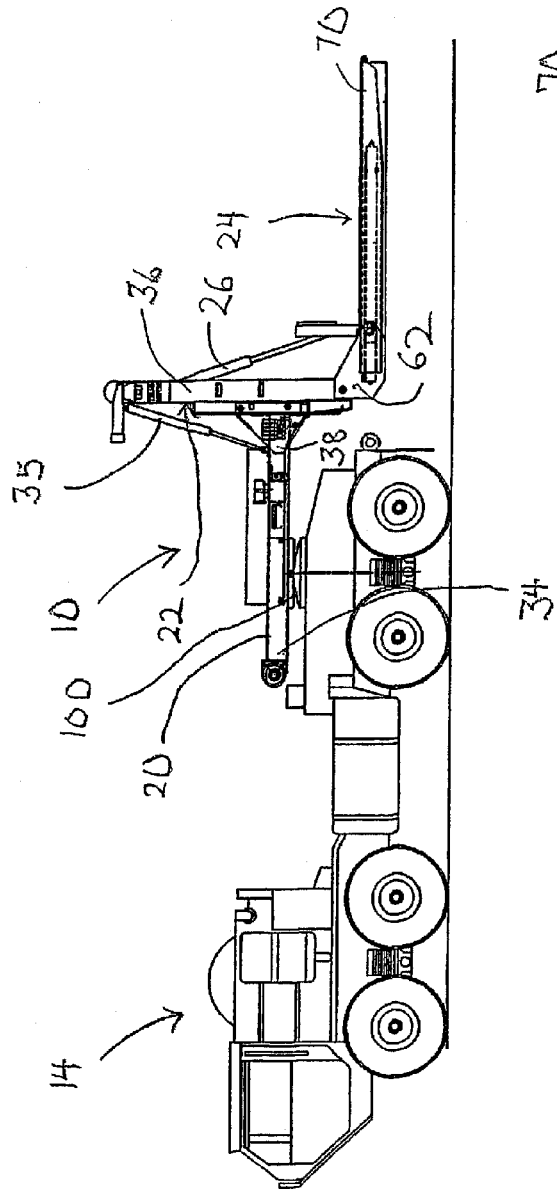
FIG. 1 is a side elevational view, partly in phantom, of a heavy duty vehicle recovery module mounted to a rear location of an armored tractor and configured in a pre-towing mode.
Figure 2:
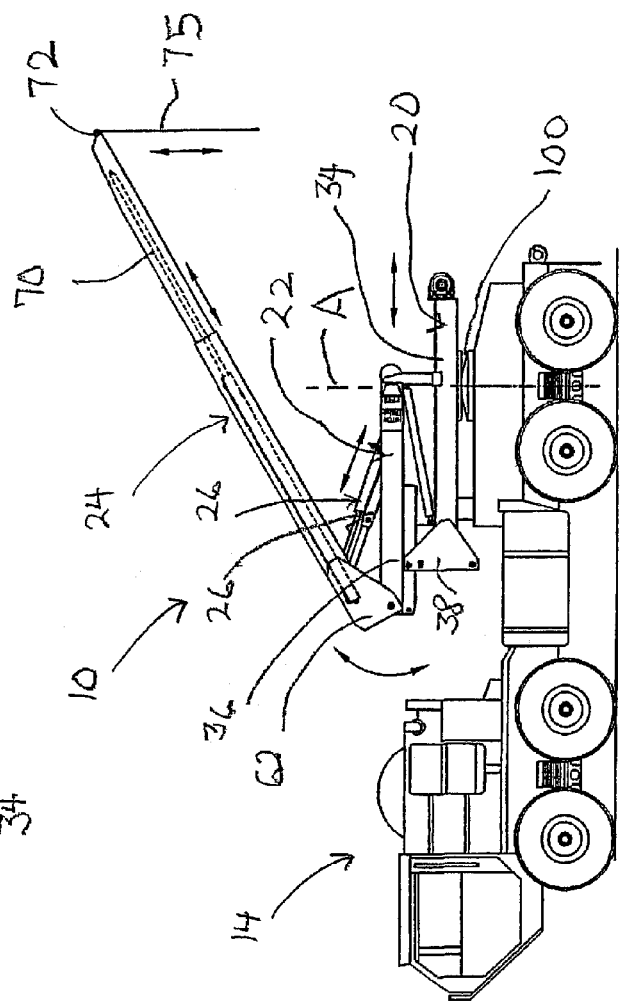
FIG. 2 is a side elevational view, partly in phantom and partly in diagram form, of the recovery module and armored tractor of FIG. 1 configured in a crane mode.

The recovery module 10 is installed on the rear chassis or bed of the tractor truck 12. The mounted recovery module 10 is foldable to compact transportation modes illustrated in FIGS. 3 and 4 and is expandable to perform various recovery tasks. The recovery module has an integrated construction and is capable of performing numerous recovery tasks. When the recovery vehicle 12, which mounts the recovery module 10, arrives at the location of the disabled heavy duty vehicle to be recovered (illustrated as vehicle 16 for explanatory purposes), the recovery module is capable of functioning as a crane to aid in the recovery of the vehicle 16, and as a towing boom to pull, winch and tow the recovered vehicle 16 from the locale. In this latter regard, the recovery module 10 is transformable to and from a crane configuration, such as illustrated in FIG. 2, from and to a towing boom configuration, such as illustrated in FIG. 1.

Figure 10:
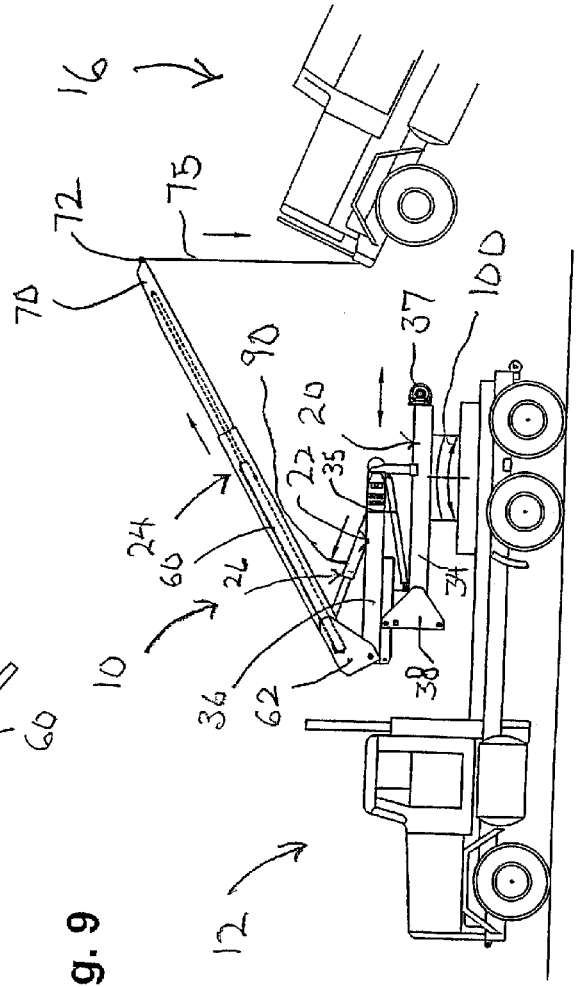
FIG. 10 is a side elevational view, partly in diagram form, of the tractor truck and recovery module of FIG. 3 illustrating the recovery module in a lifting mode hoisting a heavy duty vehicle (partially shown)

The vehicle 16 to be recovered may be secured to the crane assembly for lifting purposes (FIG. 10). For some situations, the recovery module transforms to the towing boom mode for pulling or winching the vehicle 16 to be recovered (FIGS. 7 and 8). Ultimately, the vehicle may be connected with the recovery module in a towing configuration wherein the recovery unit functions as an underlift for lifting the heavy duty vehicle 16 and placing the vehicle in condition for efficient towing by the recovery vehicle 12 (FIGS. 5 and 6). Additional capability in the lifting and pulling functions results from the rotating and oscillating features described below.

The recovery module 10 generally comprises a main support frame 20 which mounts to swivel base 100. The swivel base 100 fixedly mounts to a rear location of the recovery vehicle as will be described below. The main support frame 20 pivotally connects with an upright assembly 22 which in turn pivotally connects with a boom assembly 24.

The main support frame 20 comprises a pair of laterally spaced beams 34 which pivotally connect at one end with a pair of uprights 36 at an intermediate location of the uprights. The uprights and beams are projectable by a hydraulic cylinder 35 to a perpendicular relationship (FIG. 1). Polygonal-shaped joining plates 38 are welded to the beams 34 and the uprights 36 for joining the members. Laterally extending cross beams 40 and 42 extend between the beams and the uprights to lend stability to the assembly. The beams, uprights and cross beams are preferably heavy duty tubular steel members. A cross beam is also mounted at an upper location of the uprights. Laterally spaced pairs of connecting ears having aligned openings and an intermediate pair of connecting ears having aligned openings disposed between the outer pair of ears extend downwardly from the cross beam to secure one end of the cylinder 35. A winch 37 is mounted at the end of each beam 34, generally opposite the pivotal connection with the upright assembly. An idle pulley 39 may be mounted to the upper upright beam to facilitate use of the cable from the winch (FIGS. 7 and 8).

A boom assembly 24 is pivotally mounted to the lower portion of the upright assembly 22 when projected to the FIG. 1 position. The boom assembly comprises a pair of independently positionable booms 60. An opening 46 is formed in the lower portion of the uprights to implement the pivotal connection with the boom assembly 24. The pivotal position of the boom 60 relative to the upright assembly 22 is controlled by a pair of hydraulic units 26 and a cooperative lock subassembly. A removable and variably positionable receiver is mounted to the boom assembly for engaging the underside front portion of the truck. A second securement assembly attaches to the truck frame rearwardly of the vehicle cab from a rear terminal portion of the leg assembly.

Figure 9:
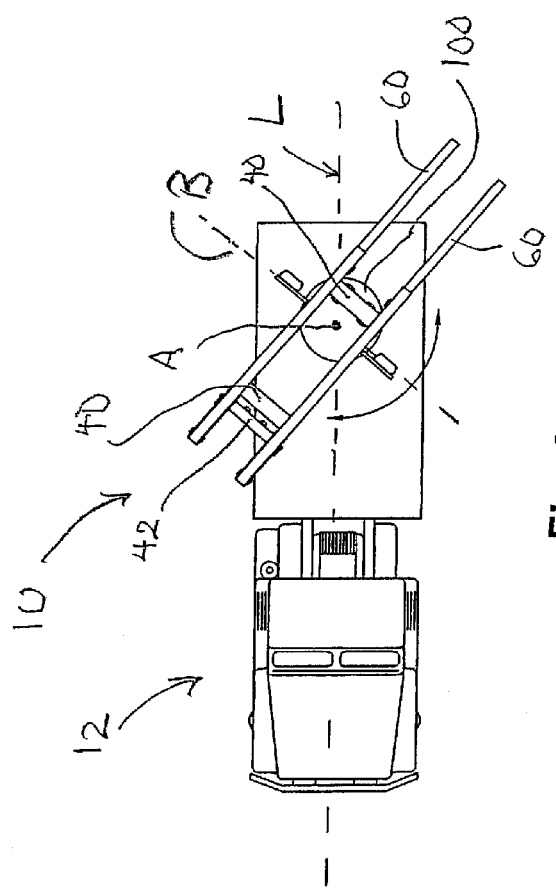
FIG. 9 is a top plan view of the tractor truck and recovery module of FIG. 3 with the recovery module being rotated.

The recovery module 10 is supported by the swivel base 100 which is mounted in fixed relationship with the rear portion of the recovery vehicle. With additional reference to FIGS. 11-13, the main support frame 20 is mounted in fixed relationship to the upper mounting plate 110 of the swivel base 100. The swivel base provides for both rotation about a central axis A and oscillation or pivoting about axis B which is orthogonal to axis A (FIGS. 2, 9).

Figure 3:
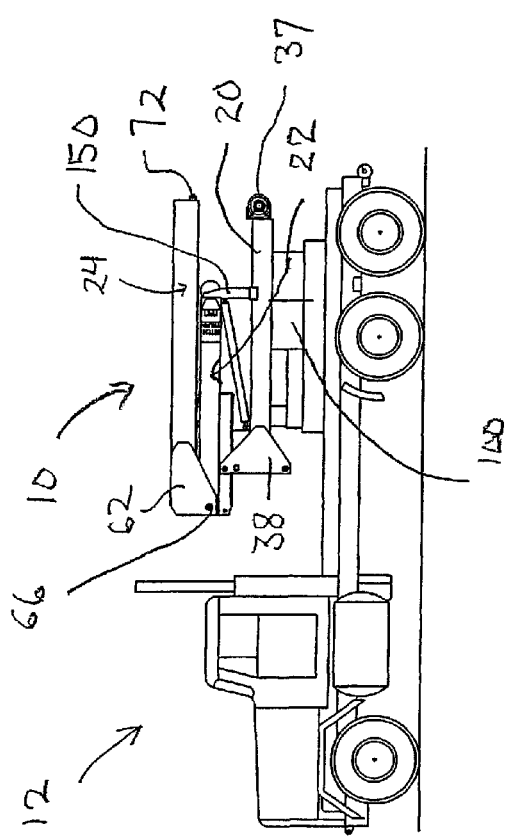
FIG. 3 is a side elevational view of the recovery module of FIG. 1 mounted at a rear location of a tractor truck and configured in a compact transport mode.

The swivel base 100 is mounted to the main frame between beams 34 and cross-beams 40 toward the front of the main frame. The mounting configuration allows the main support frame which carries the upright assembly 22 and the boom assembly 24 to rotate about the central axis A. In a first referenced position, the main frame longitudinally aligns with the central longitudinal axis L (FIG. 9) of the recovery vehicle so that a first end is disposed at the rear of the recovery vehicle as best illustrated in FIG. 3. In a second position, wherein the main frame has rotated 180° about axis A, the opposing end of the main frame is disposed at the rear with the first end being disposed adjacent the medial portions of the recovery vehicle in the configuration of FIG. 4.

In the first reference position, the recovery module is configurable in the crane function illustrated in FIGS. 2 and 10 or the storage configuration illustrated in FIG. 3. In the second reference position, the recovery module is configurable in the tow boom function configuration illustrated in FIGS. 1, 5 and 6. Intermediate angular positions (FIG. 8) are also advantageous for certain recovery operations.

Figure 11:
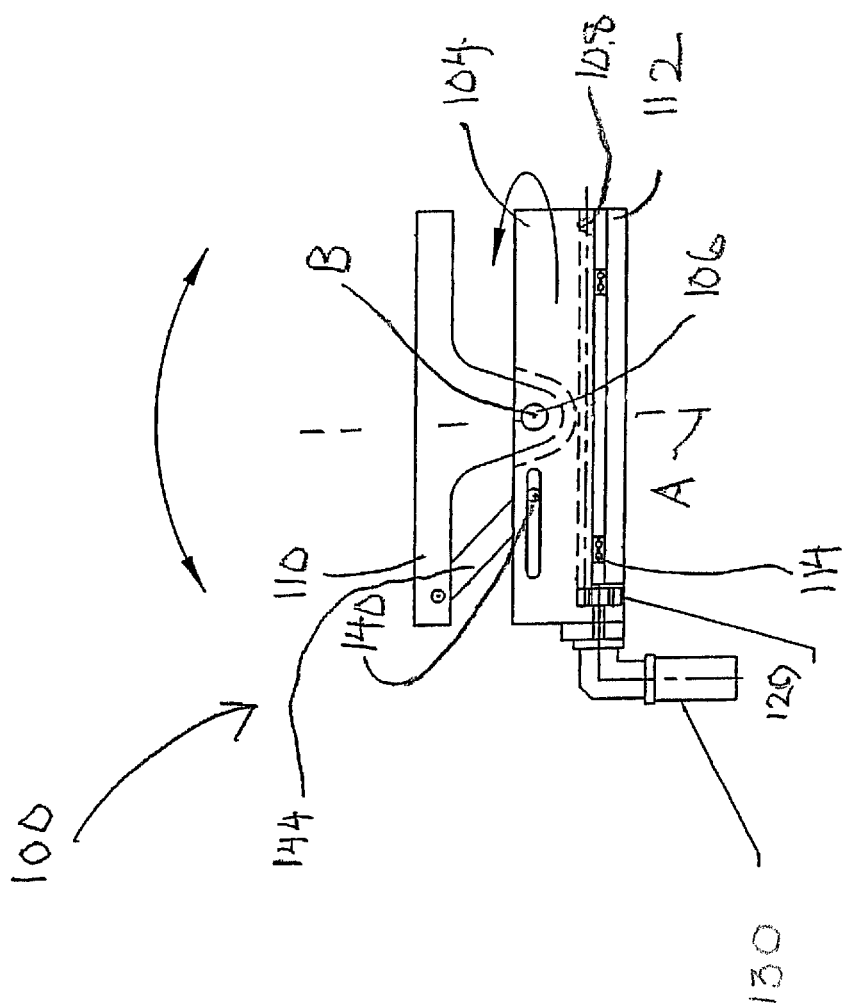
FIG. 11 is an annotated elevational view, partly in phantom and partly in diagram form, of a rotary oscillating unit of a swivel base employed in the recovery modules of FIGS. 1-10 with the unit being positioned in the horizontal orientation.

With reference to FIGS. 11, 12 and 13, the operation of the rotary oscillating unit of the swivel base 100 is illustrated and described. When the recovery unit is employed as a crane, such as for FIGS. 2 and 10, the upper mounting table 110, which connects via a tongue with the main support frame 20, is disposed in a horizontal orientation as illustrated in FIG. 10. In this position, the horizontal orientation of the table 110 is locked. It will be appreciated that the table 110 is also attached to an intermediate coupling platform 104 by a pivot pin 106 which permits pivoting about axis B through the pivot pin. A bottom mounting plate 112 mounts in fixed position to a rear location of the recovery vehicle. The platform 104 rotates relative the mounting plate 112 about axis A. A radial bearing support 114 is interposed between the platform 104 and the stationary plate 112. The platform 104 includes at its underside a circular rack 108. A pinion 120 meshes with the rack 108. The pinion is driven through a motor gear box 130 so that the platform 104 is rotatable relative to the stationary plate 112 and the upper table 110 is correspondingly rotatable about the vertical axis A.

It will be appreciated that the swivel assembly 100 is essentially capable of 360° rotation. Oscillation or pivoting about axis B is limited. A guide pin 140 follows a channel 142 and connects via an arm 144 with the table 110 to essentially limit the pivotal oscillation of the table 110 from a clockwise extreme to a counterclockwise extreme as illustrated in FIGS. 12 and 13. The foregoing rotary oscillating unit is capable of permitting oscillation when towing or winching is required, such as illustrated in FIGS. 6, 7 and 8. It will be appreciated that the rotation allows for the capability of a side recovery of a disabled vehicle if conditions warrant. The rotation is also key to transformation of the boom assembly between crane and towing modes.

The boom assembly 24 comprises a pair of steel tubular booms 60. A pair of wing plates 62 is mounted at a frontal portion to each of the legs. The wing plates 62 project upwardly from the legs 60 to form a pair of laterally spaced yokes. An aperture in each of the wing plates is alignable with the openings of the uprights. A pivot pin 66 is secured in the aligned apertures and openings for pivotally connecting the booms with the upright assembly.

Struts connect to inner sides of the booms. Pairs of ears are welded to the upper surface of the strut and project upwardly in general lateral alignment with the ears on upright cross beams for connecting hydraulic cylinders. Anchor rings for anchoring chains are rigidly mounted at opposing sides of each of the legs at positions adjacent the ends of the struts.

A telescopic extension 70 is slidably received by each leg through the rear end thereof. Each extension 70 is linearly positionable to extend the effective length of the assembly in accordance with either the dimensional constraints of the vehicle to be towed or the hoisting requirements of the crane. The rear portion of the extension is upwardly tapered. A plate is welded across the rear end of the extension. An anchoring ring is welded to the plate. A second plate is also welded at the rear underside of the extension. A stop pin projects from the extension side and interferes with the end of the leg to limit the inward telescopic position of the extension. A pair of centering bars is disposed at an inner rear end location of the leg for centering the extension. A steel strip welded at the front underside of the extension interferes with the lower centering bar to retain the extension 70 with the receiving leg 60. A linear row of openings may be formed along the sides of the legs for anchoring the receiver 30.

Each extension may include a rear idle roller or wheel 72. The roller is mounted between opposing sides of the tubular extension member and partially extends at the bottom through a rear opening to facilitate paying out or lifting the hoisting cable 75 when the extension is projected in the crane mode (FIGS. 2 and 10).

The hydraulic unit 26 comprises a pair of hydraulic cylinders 90 which are pivotally mounted to ears for pivoting about a horizontal transverse axis. A reciprocating piston drives a rod 91 which is pivotally mounted to ears for pivoting about a second horizontal transverse axis. A suitable hydraulic cylinder 90 is a Prince hydraulic cylinder having a four inch bore and a forty-eight inch stroke. Naturally, other hydraulic cylinders may be suitable. Hydraulic lines connecting the cylinders may connect with the hydraulic lines of the tractor. The hydraulic cylinders 90 function to independently retract and extend each leg to thereby define the angle between the main support frame 20, i.e., uprights 36 and the legs 60 which are positionable under the vehicle to be towed. In addition, when the upright assembly is collapsed, the cylinders 90 are actuatable to expand the boom assembly from the folded modes to the crane configuration of FIGS. 2 and 10. It will be appreciated that the extended towing configuration of FIGS. 1, 6 and 7 is obtained by using the hydraulic forces to expel the piston rod 91 to an extended position. A pair of vertical bumper strips 71 may be welded to the beam and project upwardly at the rear of the rods 91 to protect the cylinders and rods from impact by the towed vehicle.

For the towing and the pull/winching modes the boom assembly pivots downwardly about axis B. The extensions 70 function as stabilizers as illustrated in FIGS. 7 and 8.

Prior to towing the vehicle, the boom assembly 24 is positioned beneath the front end of the vehicle. The receiver 30 engages under the front wheels and/or I-beam of the vehicle. The rear securement assembly 32 secures the vehicle frame at the rear end of the leg assembly. The vehicle is thus preferably secured to the boom assembly 24 at two longitudinally spaced pairs of laterally opposed positions.

Figure 4:
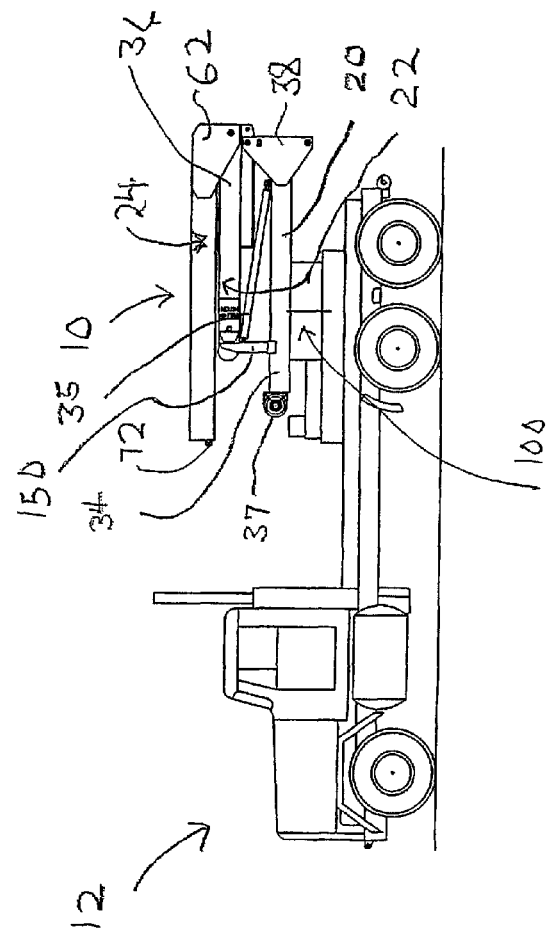
FIG. 4 is a side elevational view of the recovery module and tractor truck of FIG. 3 wherein the recovery module is rotated 180° and is configured in a compact transport mode.

With reference to FIGS. 3 and 4, the recovery module 10 operates in a very efficient manner. In the folded transport modes of FIGS. 3 and 4, a blocking 150 mounted between the beams 34 and the rear frame of the tractor is required to support the upright and boom assembly. The blocking 150 is removed during the towing operations. The mounted boom assembly is transported to the location of the vehicle to be towed. The hydraulic unit 26 is actuated to extend the leg assembly so that the legs essentially rest on the roadway or pavement forwardly and adjacent to the front end of the vehicle. The leg assembly 24 is then positioned under the frame of the vehicle as best illustrated in FIG. 6. The vehicle essentially is secured to the leg assembly at two laterally opposed longitudinal positions, i.e., four discrete positions—two by means of chains at the receiver 30 and two at the rear securement means 32 by means of chains. Frame hooks may also be employed to secure the frame. The vehicle attachment locations are adjacent the front wheel and behind the vehicle cab at the top of the frame. Although four attachment points are desired, the boom assembly would effectively operate with only a front and rear attachment of the vehicle to the leg assembly.

After the attachment has been completed, the cylinders 90 are then actuated to force the piston rods 91 to an extreme extended position illustrated in FIG. 6. The engagement of the vehicle to the leg assembly forces the boom assembly to an elevated position so that the legs 60 are essentially forced to lift from the roadway with the front end of the vehicle. The vehicle is towed via the rear wheels but there is a significant force distribution relationship between the towed vehicle, the boom assembly and the tractor. The distribution of the downward force exerted through the front end of the vehicle is such that an insubstantial force acts downwardly at the rear of the tractor to pivot the tractor frame about the rear tractor wheels. Thus, the front end of the tractor does not tend to forcibly lighten or be forced upwardly as is common in numerous other booms. The vehicle is then towed in a trailer-type fashion which is somewhat akin to having all of the towed vehicle wheels on the pavement.

When the extreme extended position of the boom assembly is attained, i.e., the FIG. 6 towing configuration, a lock subassembly automatically falls into a locked configuration wherein a latch drops into a slot. The hydraulic forces on the cylinders 90 may be released during the towing process so that extreme forces are not exerted on the hydraulic cylinders, and in particular the heads, during the towing. The transformation to the extreme pivot position actually results in a lifting of the boom assembly due to the multiple attachment points to gain ground clearance for travel during the towing. Moreover, the hydraulic cylinders are used in an efficient and optional manner which does not result in excessive pressures being exerted on the hydraulic heads.

With reference to FIGS. 14-20, a dual function crane recovery module 210 is supported by the swivel base 100. Hydraulic units employed in the recovery module 210 are illustrated in schematic in some of the figures. The swivel base is mounted in a fixed relationship at the rear portion of the recovery vehicle 12 as previously described. The dual crane recovery module 210 functions in an efficient manner so that both a light duty crane configuration as well as a heavy duty crane configuration may be efficiently realized in addition to the recovery module being transformed to a towing function as previously described for recovery module 10. For recovery module 210 in both the light duty crane configuration and the heavy duty crane configuration, two independently positionable and operable cranes are provided.

A main support frame 220 is mounted at a fixed relationship to the upper mounting plate 110 of the swivel base (see FIGS. 11-13). The swivel base provides for rotation about a central axis A and oscillation or pivoting about an axis B which is orthogonal to axis A as previously described. The radial bearing 114 in one embodiment is an MTB-870 heavy duty turntable bearing supplied by Kaydon Corporation of Ann Arbor, Mich.

Figure 14:
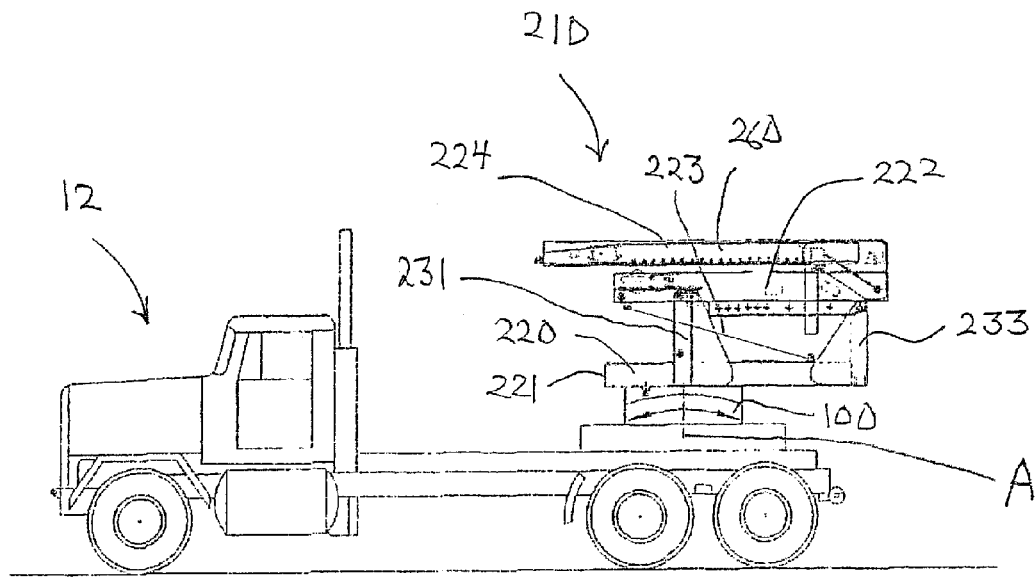
FIG. 14 is a side elevational view of a modified recovery module and the tractor truck of FIG. 3 wherein the modified recovery module is adaptable as a dual function crane and is rotated 180 degrees and is configured in a compact storage mode.

The main support frame 220 carries the upright assembly 222 and the boom assembly 224 which collectively are capable of rotation about the central axis A. In a first reference position, such as illustrated in FIG. 14, the main frame 220 longitudinally aligns with the central longitudinal axis L of the recovery vehicle so that a first end 221 is disposed toward the front of the recovery vehicle as best illustrated in FIG. 14. In a second position the main frame is rotated 180 degrees about axis A so that the end 221 of the main frame is disposed toward the rear with the opposed end being disposed adjacent the medial portions of the recovery vehicle in the configuration of FIG. 15. The structures of the main support frame 220, upright assembly 222 and boom assembly 224 are substantially identical to those of main support frame 20, upright assembly 22 and boom assembly 24, respectively, except for the modifications described below.

The main support frame 220 connects with pairs of longitudinally spaced support struts 231, 233. The rear support struts 231 are essentially centered over the swivel plate assembly in the folded position of FIG. 15. The upright assembly 222 is supported on the support struts 231, 233 with the upright assembly being typically pivotally mounted to the rear support strut 231 in a quasi-cantilever fashion so that the rear portion of the upright assembly in the configurations of FIGS. 16 and 17 extends rearwardly in spaced relationship over the main support frame. The frontal portion (FIGS. 16 and 17) of the upright assembly pivotally mounts the boom assembly 224.

Figure 15:
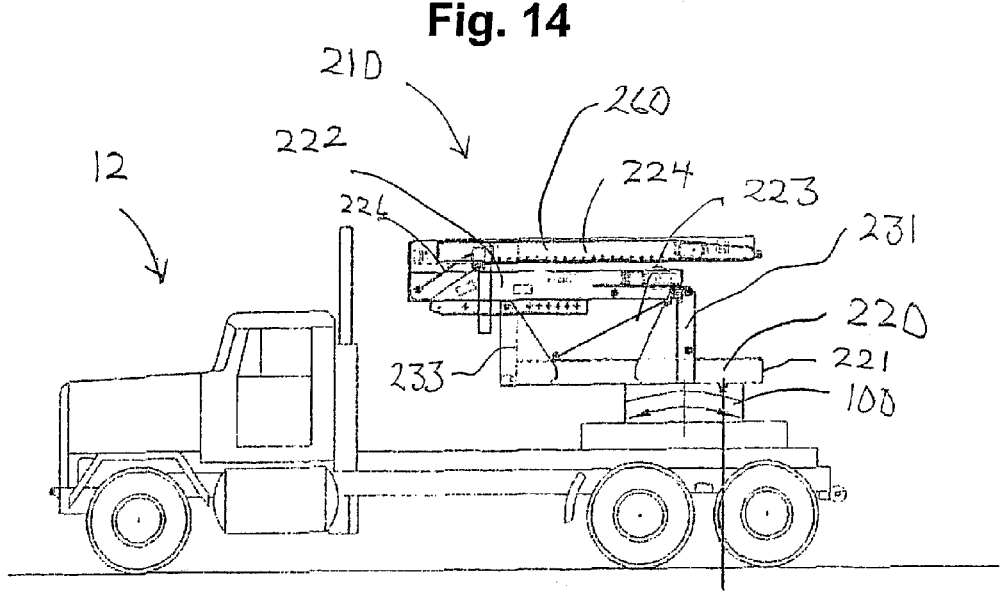
FIG. 15 is a side elevational view of the dual function crane recovery module and tractor truck of FIG. 14, said module configured in a compact transport mode.
Figure 16:
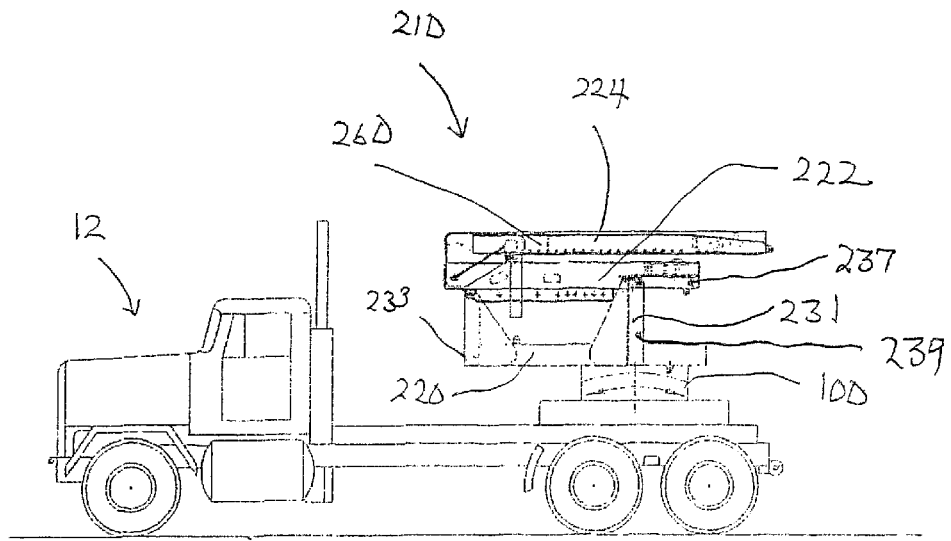
FIG. 16 is a side elevational view of the dual function crane recovery module and tractor truck of FIG. 15, said module configured in an intermediate transformation step to a light duty crane mode.

To transform the recovery module to a crane mode, the upright assembly 222 which carries the boom assembly 224 moves rearwardly relative to the main support frame 220 as illustrated by the contrasting positions of FIGS. 15 and 16. The sliding is implemental by a hydraulic unit 223.

Figure 17:
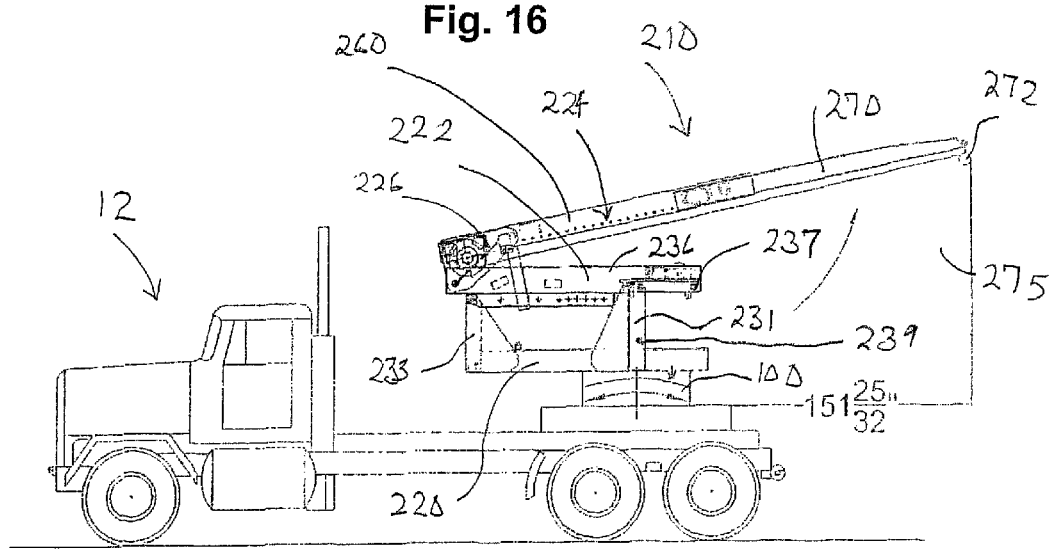
FIG. 17 is a side elevational view, partly in diagram form, of the dual function crane recovery module and tractor truck of FIG. 16, said module configured in a light duty crane mode.

The boom assembly 224 comprising a pair of angularly positionable booms 260 is pivotable to an upper inclined angular position by means of hydraulic units 226, as best illustrated in FIG. 17. In addition, each boom of the boom assembly comprises a slidable extension 270 which is outwardly projectable (rearwardly) to form an elongated boom. A sleeve 271 may be mounted to reinforce the interface between the boom and the outer extension boom. Each of the outer boom extensions 270 includes a pulley 272 over which a cable 275 from a winch 277 may be suspended. Thus, a light duty crane configuration comprising two crane booms is provided (only one visible in FIG. 17). It should be appreciated that each of the booms 260 and extensions 270 is independently positionable both with respect to extension and with respect to the elevation angle whereby two independent cranes are provided at the rear of the tractor truck.

Figure 18:
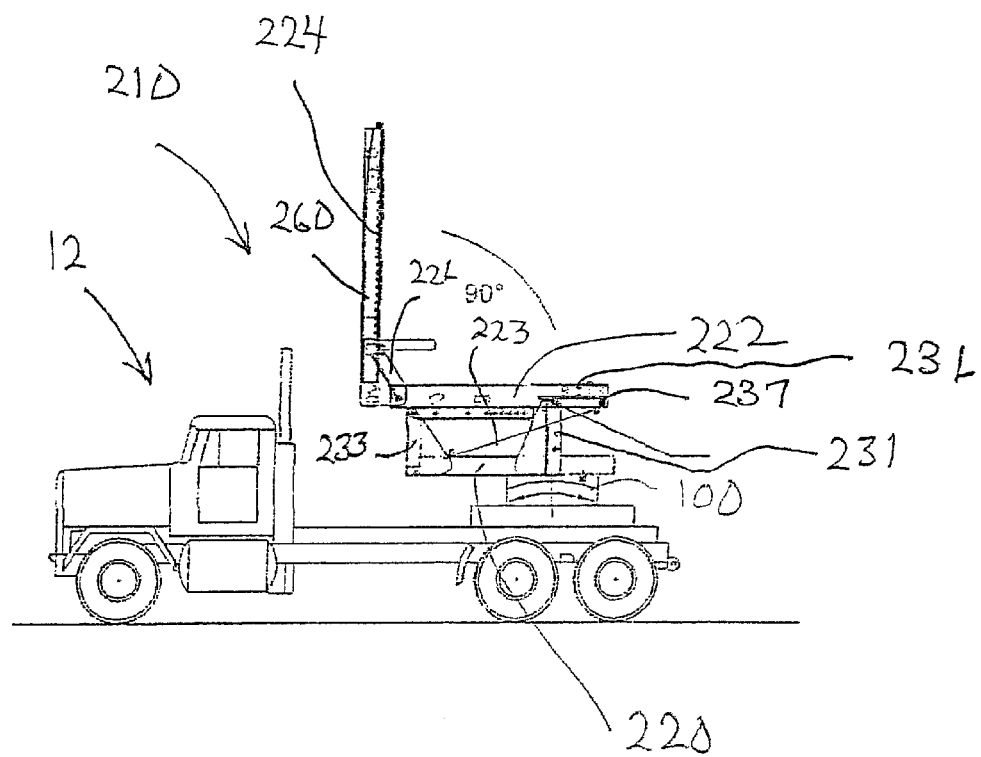
FIG. 18 is a side elevational view, partly in diagram and annotated form, of the dual function crane recovery module and tractor truck of FIG. 16, said module configured in a transformation step to a heavy duty crane mode.
Figure 19:
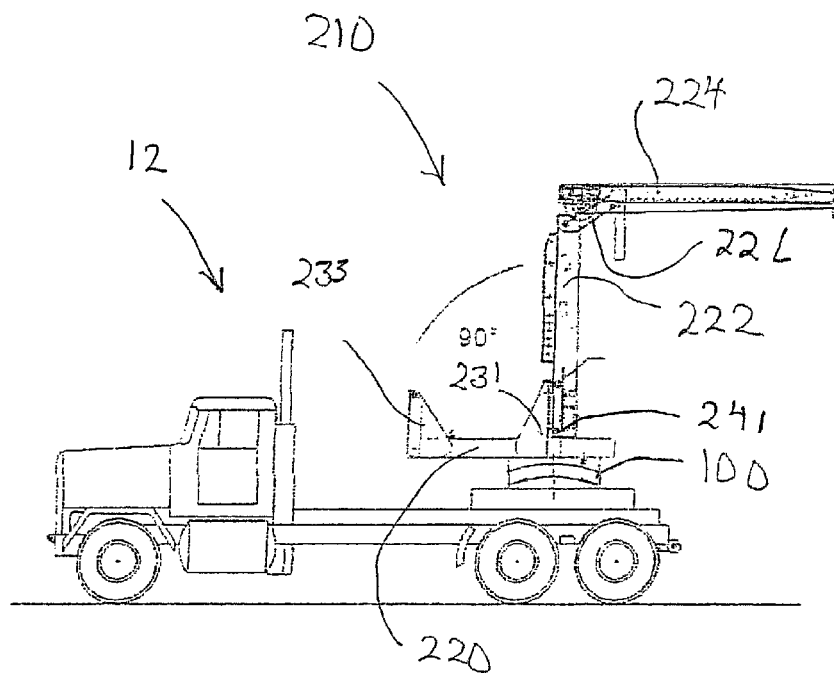
FIG. 19 is a side elevational view, partly in diagram form, of a dual function crane recovery module and tractor truck of FIG. 18, said module configured in a subsequent transformation step in a sequence to a heavy duty crane mode.
Figure 20:
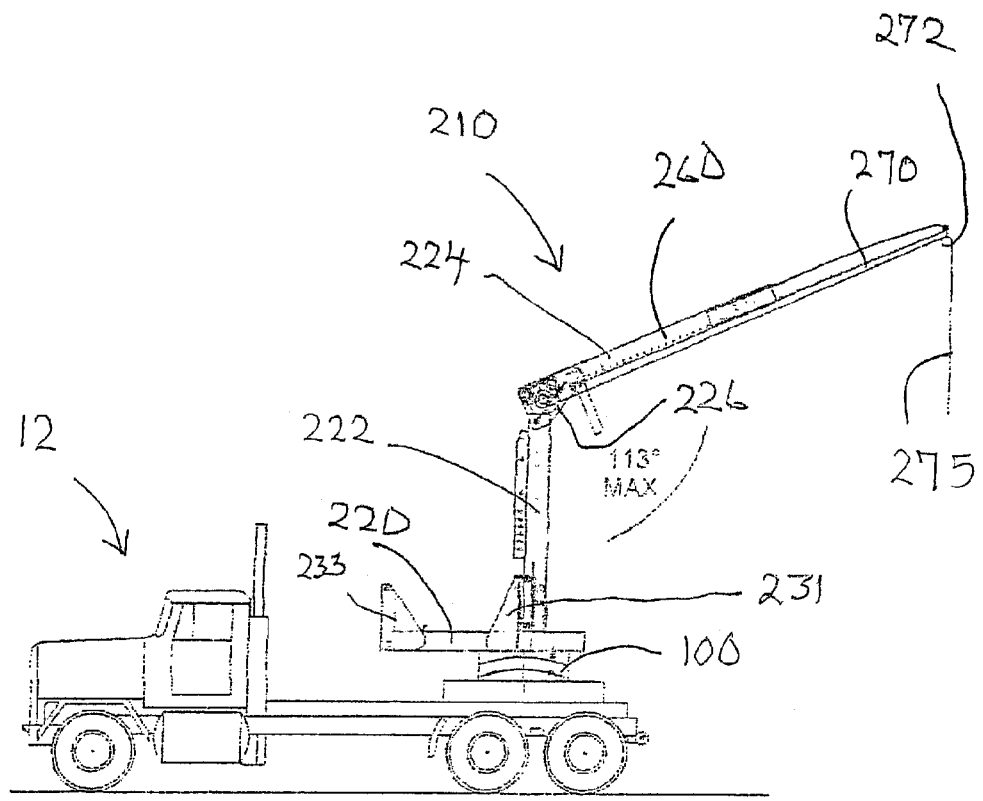
FIG. 20 is a side elevational view, partly in schematic and partly in diagram form, of the dual function crane recovery module and tractor truck of FIG. 19, said module configured in a subsequent heavy duty crane mode.
Figure 21:
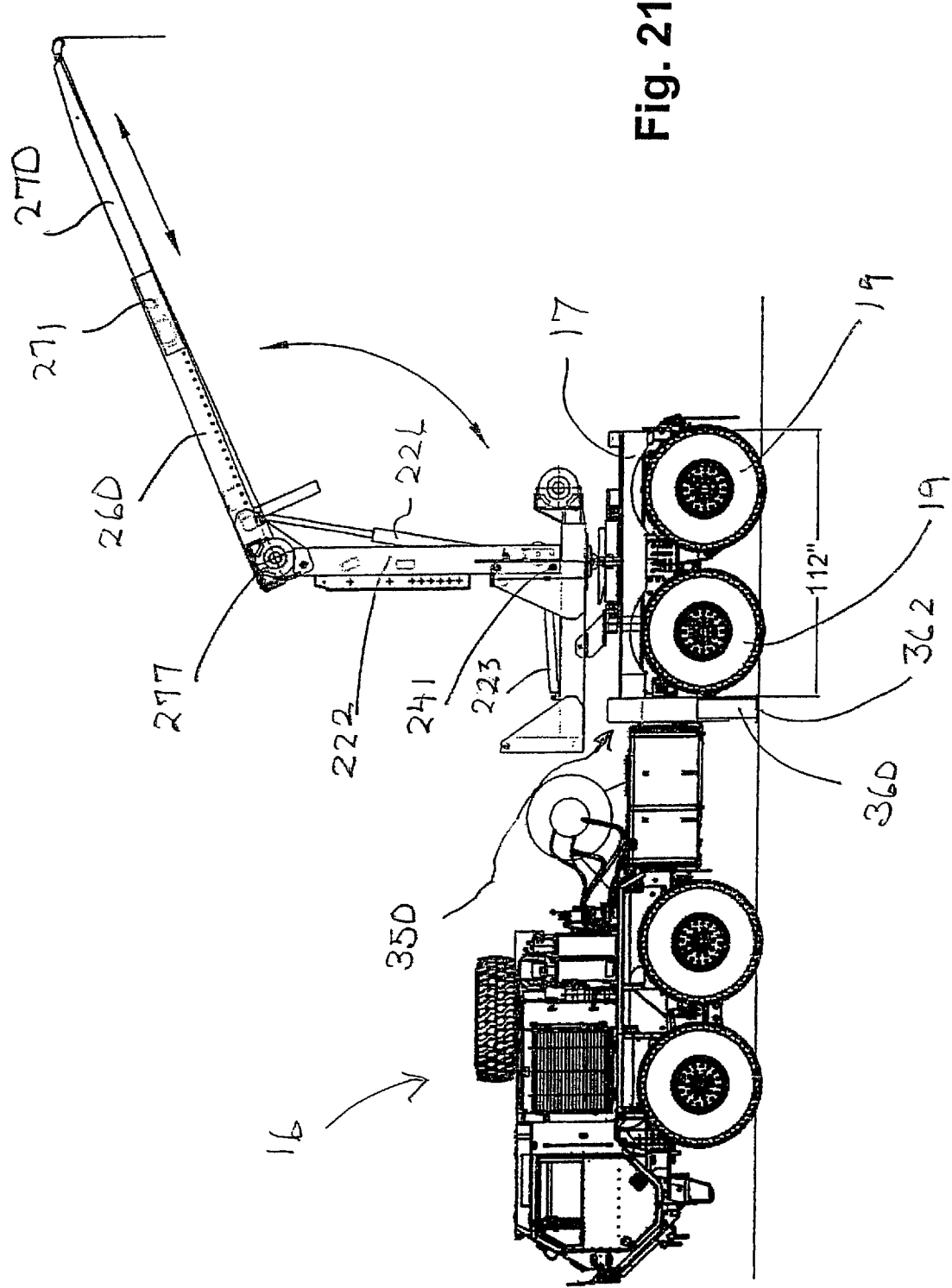
FIG. 21 is a side elevational view, partly in diagram form, of a vehicle and the dual function crane recovery module configured in a heavy duty crane mode.
Figure 22:
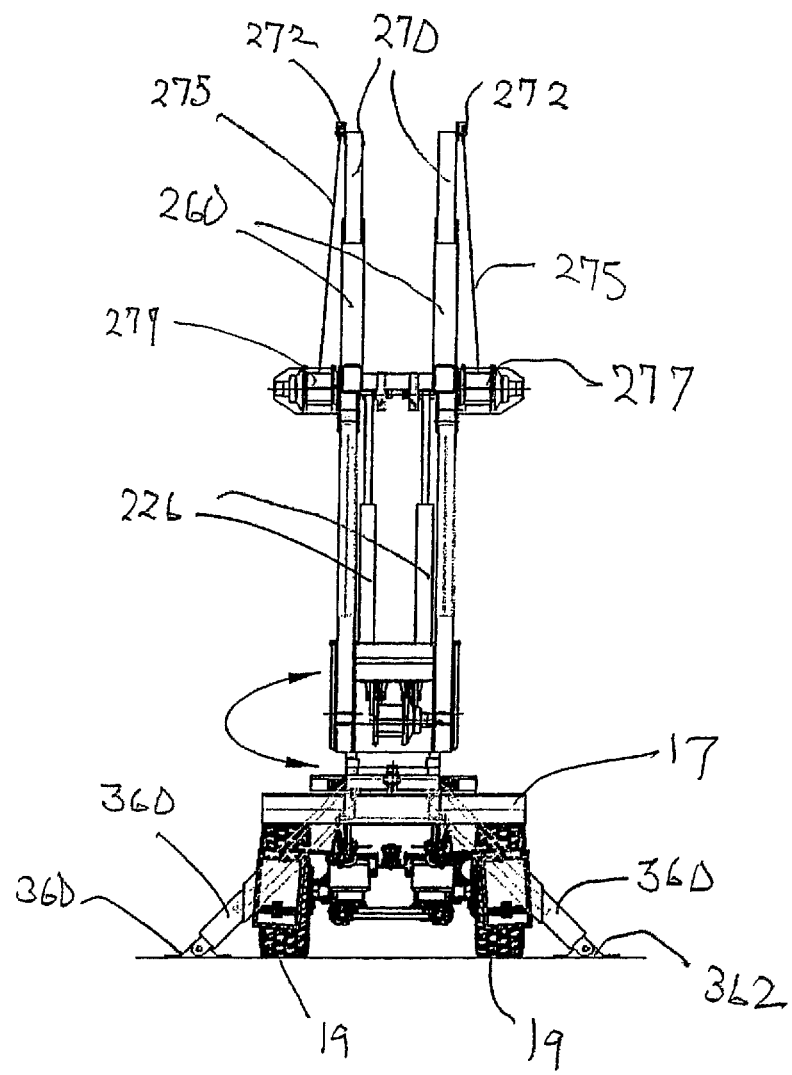
FIG. 22 is a rear elevational view, partly in diagram form, of the vehicle and the dual function crane recovery module of FIG. 21.
Figure 23:
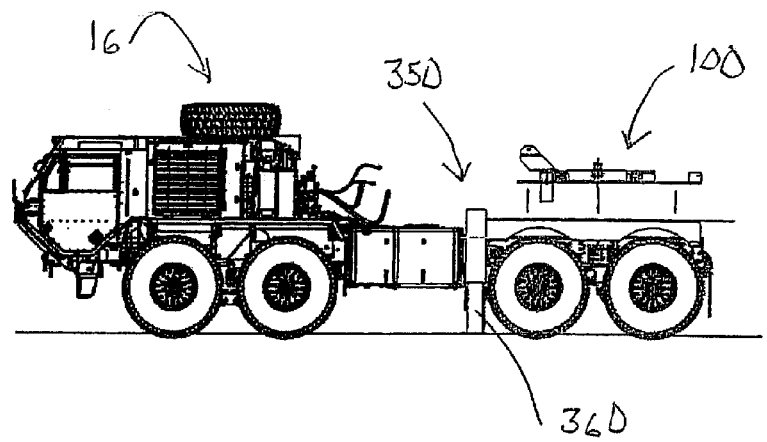
FIG. 23 is a side elevational view, partly exploded and partly in schematic, illustrating the vehicle of FIG. 21 in a pre-assembled state without the dual function crane recovery module.
Figure 24:
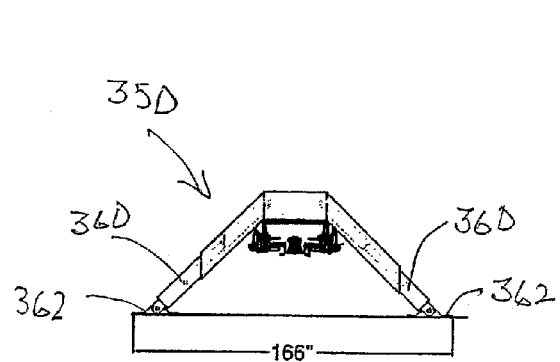
FIG. 24 is a central rear interior view, partly in section and partly in diagram form, illustrating the portion of the vehicle of FIG. 23 with stabilizers in an extended position.
Figure 25:
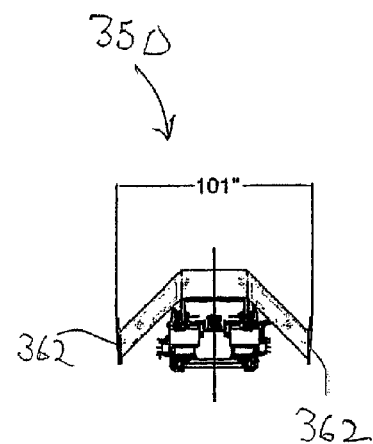
FIG. 25 is an interior view, partly in section and partly in diagram form, of the portion of FIG. 23 with the stabilizers being illustrated in the retracted position.
Figure 26:
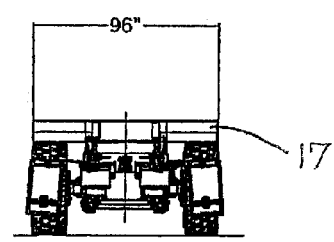
FIG. 26 is a rear elevational view, partly in diagram form, of the vehicle of FIG. 23.

The recovery module 210 is transformable to a heavy duty crane mode, as best illustrated in FIGS. 18-20. The ends of the uprights 236 include openings 237. The hydraulic unit 233 acts to force the upright assembly to a vertical position as illustrated in FIG. 19. When the upright assembly is pivoted upwardly approximately 90 degrees, as illustrated in FIG. 19, openings in the uprights align with openings 239 in the support strut. Pins 241 are inserted into the openings to secure the uprights in a stable rigid upright vertical configuration, as illustrated in FIGS. 19 and 20. Hydraulic units 223 which are employed to complete the pivot are not illustrated in FIGS. 19 and 20. The boom extensions 270 may then be projected from the nestled configuration of FIG. 19 to that of FIG. 20. In addition, hydraulic units 226 are employed to elevate the projected boom assembly to an angular elevated position as best illustrated in FIG. 20. It will be appreciated that the forward end portion of the main support assembly essentially functions as a counterweight to the heavy duty crane configuration.

With reference to FIGS. 21-26, recovery module 210 is mounted to the rear platform 17 of an armored vehicle 16. The noted drawings are also illustrative of stabilizing and balancing considerations that go into the dual function crane recovery module. In the heavy duty crane mode of FIG. 21, it will be appreciated that the upright assembly 222 is generally vertical at the mid-point between the two rear wheels 19 of the vehicle 16. The vehicle also includes a stabilizing assembly 350 which is mounted to the rear platform 17 and functions to provide side stabilization for the crane. Representative dimensional relationships are included in the drawings for one embodiment of the dual function crane recovery module and vehicle. Naturally, other dimensional relationships can also be implemented.

With reference to FIGS. 23-26, the stabilizer assembly 350 is preferably mounted adjacent the forward end of the platform 18 employed for the dual crane recovery module and thus is located at a medial portion of the vehicle. The stabilized assembly comprises opposed stabilizers 360 which are projectable at downward oblique angles at opposite sides of the platform and include pads 362 for engaging the ground. Naturally, the stabilizers are retractable. In one projected configuration, the stabilizers extend to a projected distance of 166 inches and retract to a spacing of approximately 101 inches. The platform 18 width is preferably 96 inches. Clearly other dimensional relationships are possible.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A crane assembly comprising:
a vehicle chassis;
a main beam assembly disposed on said chassis comprising an elongated beam with a pair of longitudinally spaced supports, said supports comprising struts which project generally away from said beam and are fixed with respect to said beam;
an upright assembly pivotally connected to one support and positionable in a first position supported on said second support in a generally horizontal position above and parallel to said main beam assembly and positionable in a second position generally perpendicular to said main beam assembly; and
a boom assembly pivotally connected to said upright assembly and having a first member and an extension slidably received by said first member and extendable to an extended position from a retracted position, said boom assembly being pivotal to a stable inclined position at an angle to said upright assembly wherein said boom assembly is entirely disposed above said main beam assembly in said extended position when said upright assembly is in said first position and when said upright assembly is in said second position, said boom assembly being capable of operative deployment at a level above the chassis or at a level below the chassis for engagement of an object to be supported.

2. The crane assembly of claim 1, wherein said boom assembly further comprises a second member with an outer beam extension slidably received by said second member.

3. The crane assembly of claim 2, wherein a sleeve interface is mounted to reinforce the interface between each member and each outer boom extension.

4. The crane assembly of claim 3 wherein each of the outer boom extensions includes a pulley over which a cable from a winch is suspended.

5. The crane assembly of claim 1 wherein there are two crane booms and each of said booms is independently positionable with respect to its elevation angle and its corresponding extension is also independently positionable.

6. The crane assembly of claim 1 and further comprising a recovery vehicle having a swivel base fixedly mounted to a rear location of said recovery vehicle, said main beam assembly mounted to said swivel base.

7. The crane assembly of claim 1, wherein a said support has a first opening and said upright assembly defines a second opening which aligns with said first opening in said second position and a pin extends through said openings to secure said upright assembly in said second position.

8. The crane assembly of claim 1 which said upright assembly is vertically spaced from said main beam assembly in said first position.

9. A crane assembly comprising:
a vehicle chassis;
a swivel base assembly mounted to said chassis;
a main beam assembly mounted to said swivel base assembly and comprising an elongated beam and a pair of longitudinally spaced support members comprising struts which project away from said beam and are fixed with respect to said beam;
an upright assembly pivotally connected to one support member and positionable in a first position supported on said second support member in a generally horizontal position parallel to said main beam assembly and positionable in a second position generally perpendicular to said main beam assembly; and
a boom assembly pivotally connected to said upright assembly and having a first member and an extension slidably received by said first member and extendable to an extended position from a retracted position, said boom assembly being pivotal to a stable inclined position at an angle to said upright assembly wherein said boom assembly is entirely disposed above said main beam assembly in said extended position when said upright assembly is in said first position and when said upright assembly is in said second position, said boom assembly being capable of operative deployment at a level above the chassis of the carrying vehicle or at a level below the chassis for engagement of an object to be supported.

10. The crane assembly of claim 9 and further comprising a recovery vehicle having a rear location, said swivel base being fixedly mounted to the rear location of said recovery vehicle.

* * * * *